(12) United States Patent
Ostwald et al.

(10) Patent No.: US 8,890,458 B2
(45) Date of Patent: Nov. 18, 2014

(54) SELECTIVELY BIASED ROBOT MECHANISM PLATFORM FOR A STORAGE LIBRARY

(75) Inventors: Timothy Craig Ostwald, Boulder, CO (US); Joseph Paul Manes, Arvada, CO (US); Daniel James Plutt, Superior, CO (US)

(73) Assignee: Oracle International Corporation, Redwood City, CA (US)

( * ) Notice: Subject to any disclaimer, the term of this patent is extended or adjusted under 35 U.S.C. 154(b) by 502 days.

(21) Appl. No.: 13/350,437

(22) Filed: Jan. 13, 2012

(65) Prior Publication Data
US 2013/0181794 A1 Jul. 18, 2013

(51) Int. Cl.
*B25J 9/18* (2006.01)
*G11B 15/68* (2006.01)

(52) U.S. Cl.
CPC .................................... *G11B 15/682* (2013.01)
USPC ................... 318/568.11; 318/568.1; 318/567; 318/560

(58) Field of Classification Search
CPC ...................................................... G11B 15/682
USPC .......................... 318/568.11, 568.1, 567, 560
See application file for complete search history.

(56) References Cited

U.S. PATENT DOCUMENTS 7,798,489 B2 * 9/2010 Baena et al. .................. 271/217

* cited by examiner

*Primary Examiner* — David S Luo
(74) *Attorney, Agent, or Firm* — Marsh Fischmann & Breyfogle LLP; Daniel J. Sherwinter

(57) ABSTRACT

Systems and methods are described for providing selective biasing of a platform in context of one or more modules. While moving in the Z-direction with respect to the modules, the platform travels in an unbiased manner. For example, one or more alignment features on the platform are engaged with one or more alignment features on the modules to allow the platform to substantially float within an X-Y region defined by the alignment features. When the platform reaches its desired Z-location, magnetic features bias the platform into a substantially locked and repeatable X-Y position (e.g., using permanent magnets and/or electromagnets). In some embodiments, the platform is locked into an accurate position to allow a robotic mechanism of a storage library to move around efficiently within the modules while still being able to perform operations that involve accurate positioning (e.g., pick and place operations on media cartridges).

20 Claims, 11 Drawing Sheets

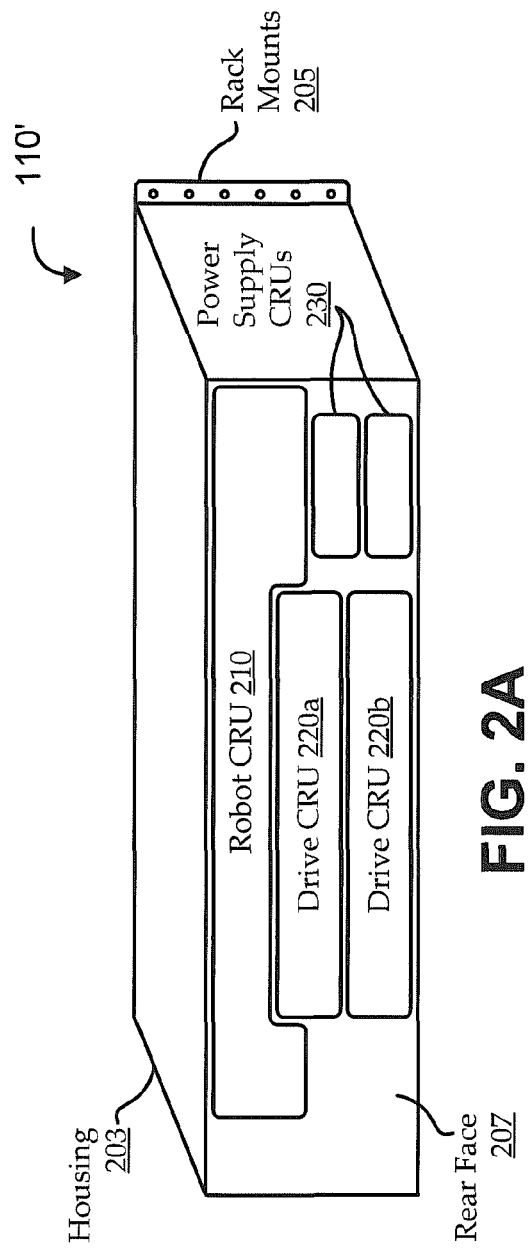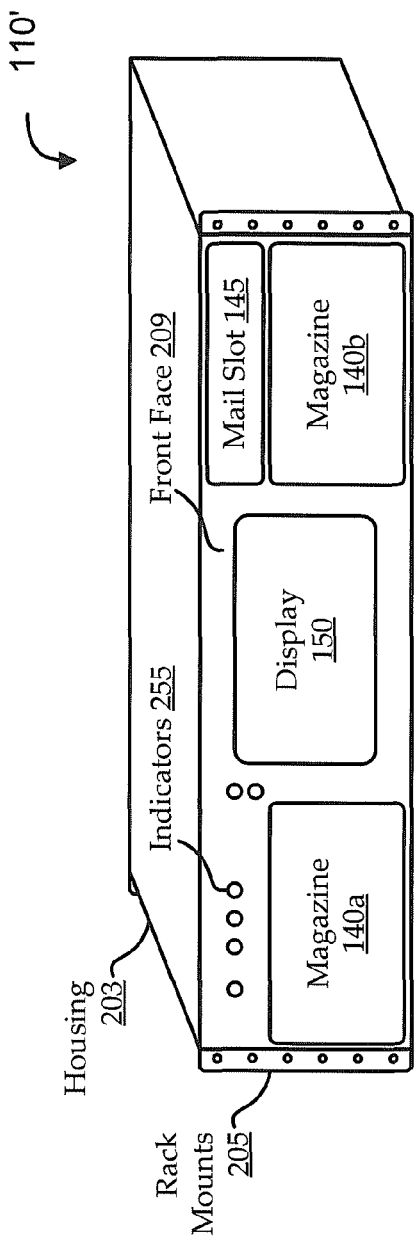

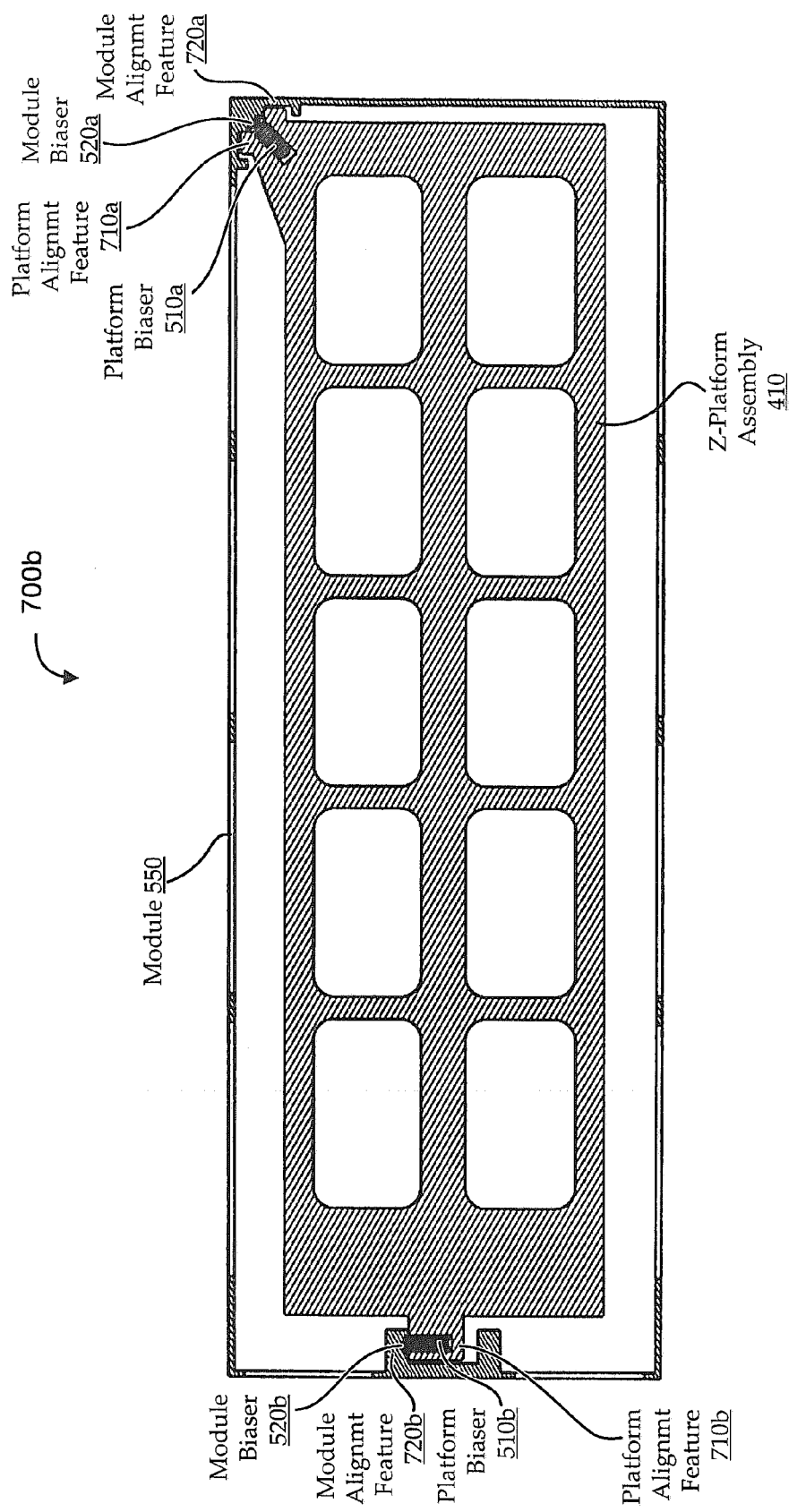

SELECTIVELY BIASED ROBOT MECHANISM PLATFORM FOR A STORAGE LIBRARY

FIELD

Embodiments relate generally to data storage systems, and, more particularly, to biasing of robot mechanisms in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (10) operations on multiple cartridges.

To operate properly, the robotic mechanisms are expected to reliably (e.g., repeatably and accurately) and rapidly find, retrieve, and deliver desired cartridges throughout the storage library cartridge inventory. This functionality can be facilitated by configuring the robotic mechanism to move a hand assembly in at least three axes (e.g., x, y, and z directions, and sometimes one or more of pitch, roll, or yaw), and to include one or more sensors to reliably detect the position and/or orientation of the hand assembly. When in its desired location, the hand assembly is activated to reliably grip the desired cartridge and remove it from a magazine or drive, or to reliably release the cartridge into a desired magazine slot or drive.

In many implementations, it is desirable for the robotic library to have free running mechanisms to glide smoothly between locations. However, it may be necessary to securely station the robotic mechanism in its desired location to repeatably and reliably perform certain types of operations, such as pick and place operations. Accordingly, implementations of robotic mechanisms may include complex designs to facilitate the two-state operation where the robotic mechanism can move in a substantially frictionless manor and park in a substantially locked manner.

BRIEF SUMMARY

Among other things, systems and methods are described for providing selective biasing of a robotic mechanism platform. Some embodiments operate in context of the data storage library having a robotic mechanism that travels in a Z-direction on a platform and in X, Y, and or other directions on structures (e.g., rails) of the platform. While moving in the Z-direction, the platform travels in an unbiased (e.g. substantially frictionless) manner within the confines of one or more modules. For example, one or more alignment features on the platform are in communication with one or more alignment features on the modules to allow the platform to substantially float within an X-Y region defined by the alignment features. When the platform reaches its desired Z-location, magnetic features bias the platform into a substantially locked and repeatable X-Y position. This can allow the robotic mechanism to move around efficiently within the modules while still being able to perform operations that involve accurate location of robotic mechanism features (e.g., pick and place operations on media cartridges).

According to one set of embodiments, a system is provided for selectively biasing a platform. The system includes: a module having a frame that defines a cavity, the module comprising a module biaser, and the housing defining a module alignment feature; and a platform. The platform includes: a platform alignment feature configured to engage with the module alignment feature in such a way that forms an alignment region within which the platform floats substantially orthogonally to a Z direction while the platform is traveling in the Z direction; and a platform biaser configured to magnetically engage with the module biaser in such a way that parks the platform in a substantially fixed position within the alignment region when the platform is not traveling in the Z direction. At least one of the platform biaser or the module biaser comprises a magnet configured to exert a magnetic force on the other of the platform biaser or the module biaser.

According to another set of embodiments, a method is provided for selectively biasing a platform. The method includes: moving a platform in a Z direction to a desired Z location with respect to a module, the module having a frame that defines a cavity, the platform comprising a platform alignment feature configured to engage with a module alignment feature of the module in such a way that forms an alignment region within which the platform floats substantially orthogonally to the Z direction while traveling in the Z direction; and upon reaching the desired Z location, parking the platform in a substantially fixed position within the alignment region by using a magnet to magnetically engaging a platform biaser of the platform with a module biaser of the module. At least one of the platform biaser or the module biaser comprises the magnet, and the magnet is configured to exert a magnetic force on the other of the platform biaser or the module biaser.

In some such embodiments, the magnetic force is strong enough to automatically park the platform in the substantially fixed position within the alignment region when the platform is not traveling in the Z direction, and the magnetic force is weak enough to disengage from the other of the platform biaser or the module biaser when a Z-directional force is applied to move the platform in the Z direction. For example, the magnet is a permanent magnet; disengaging the platform biaser from the module biaser comprises applying a directional force in the Z direction to the platform to break magnetic engagement between the platform biaser and the module biaser; and moving the platform in the Z direction comprises continuing to apply the directional force in the Z direction (e.g., by raising the platform using pulleys or by releasing slack to the pulleys to allow gravitational force to pull the platform downward). In other such embodiments, the magnet is an electromagnet in communication with an actuator configured to adjust the magnetic force generated by the electromagnet; and parking the platform in a substantially fixed position within the alignment region comprises using the actuator to adjust the magnet force generated by the electromagnet to magnetically engage the platform biaser with the module biaser.

BRIEF DESCRIPTION OF THE DRAWINGS

The present disclosure is described in conjunction with the appended figures:

FIGS. 2A and 2B show rear and front views, respectively, of an illustrative base module, according to various embodiments;

FIG. 7B shows a top view of the illustrative platform system of FIG. 7A;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
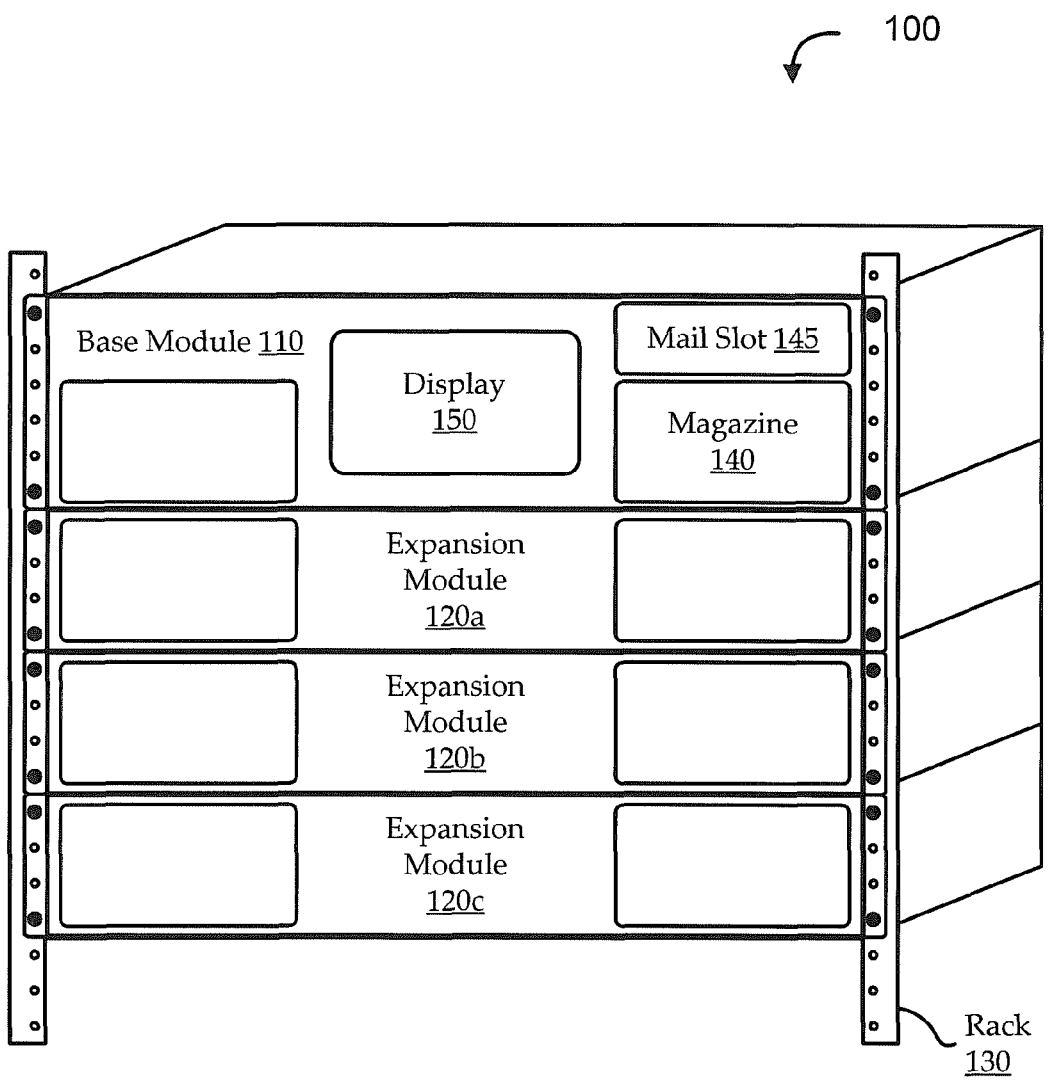
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

Figure 3A:
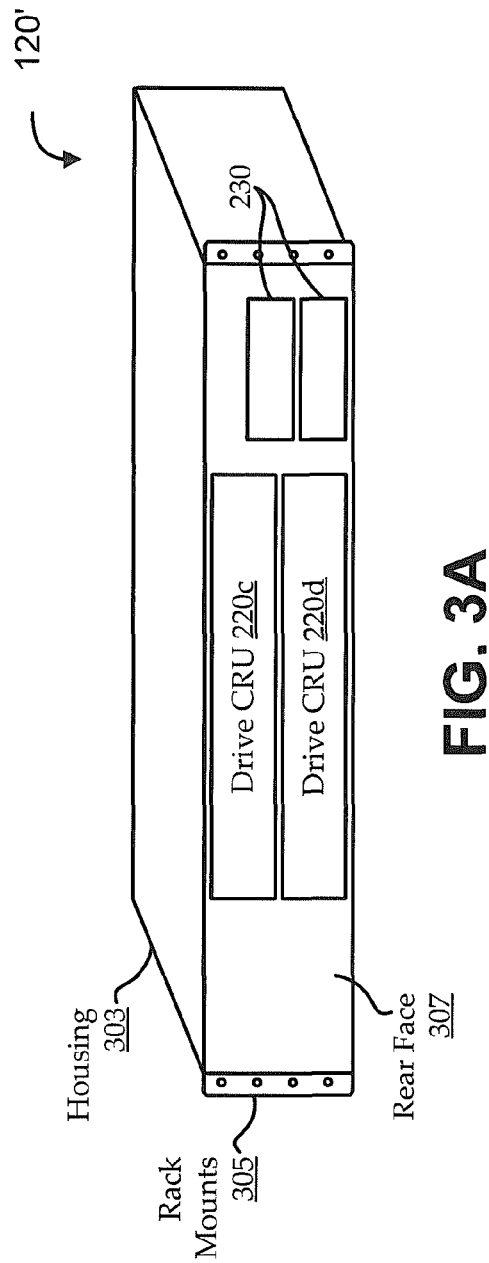
FIGS. 3A and 3B show rear and front views, respectively, of an illustrative expansion module, according to various embodiments.
Figure 3B:
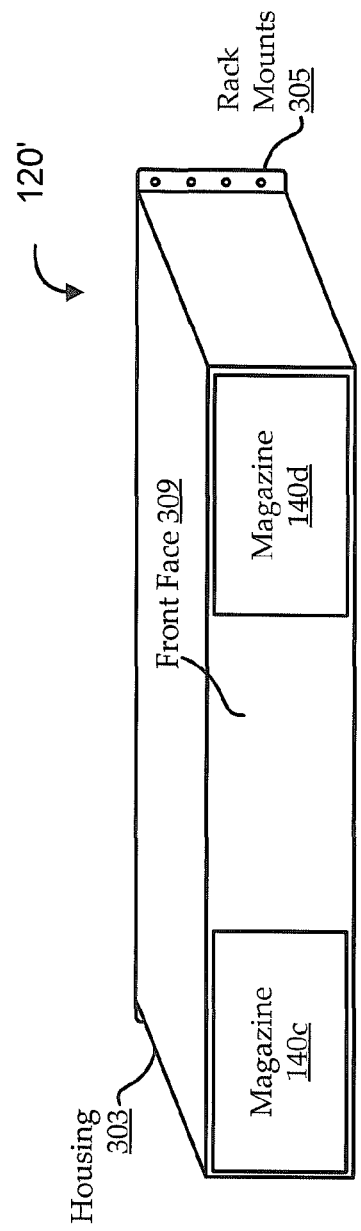

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4A:
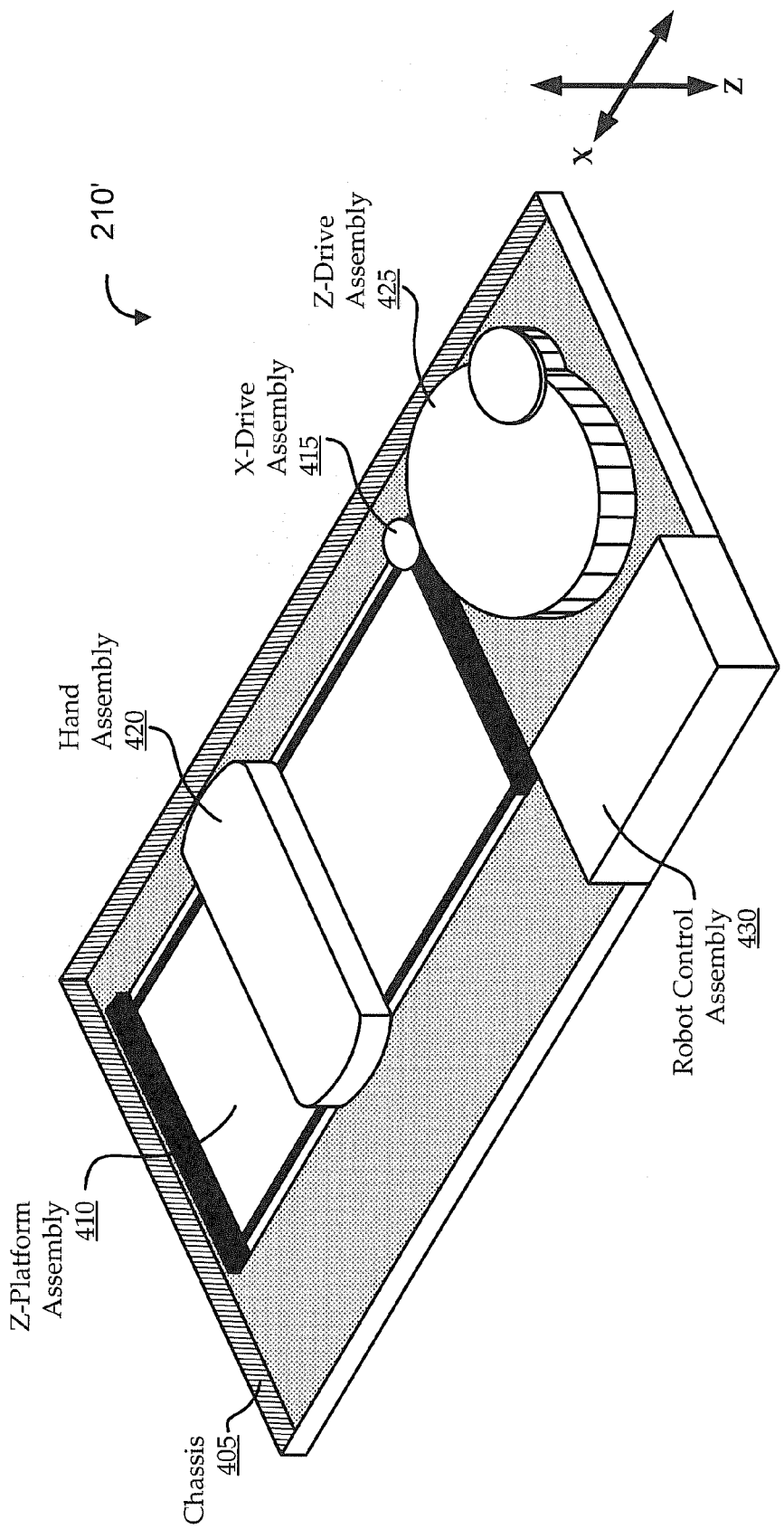
FIG. 4A shows a view looking down on the underside of an illustrative robot CRU (customer replaceable unit), according to various embodiments.
Figure 4B:
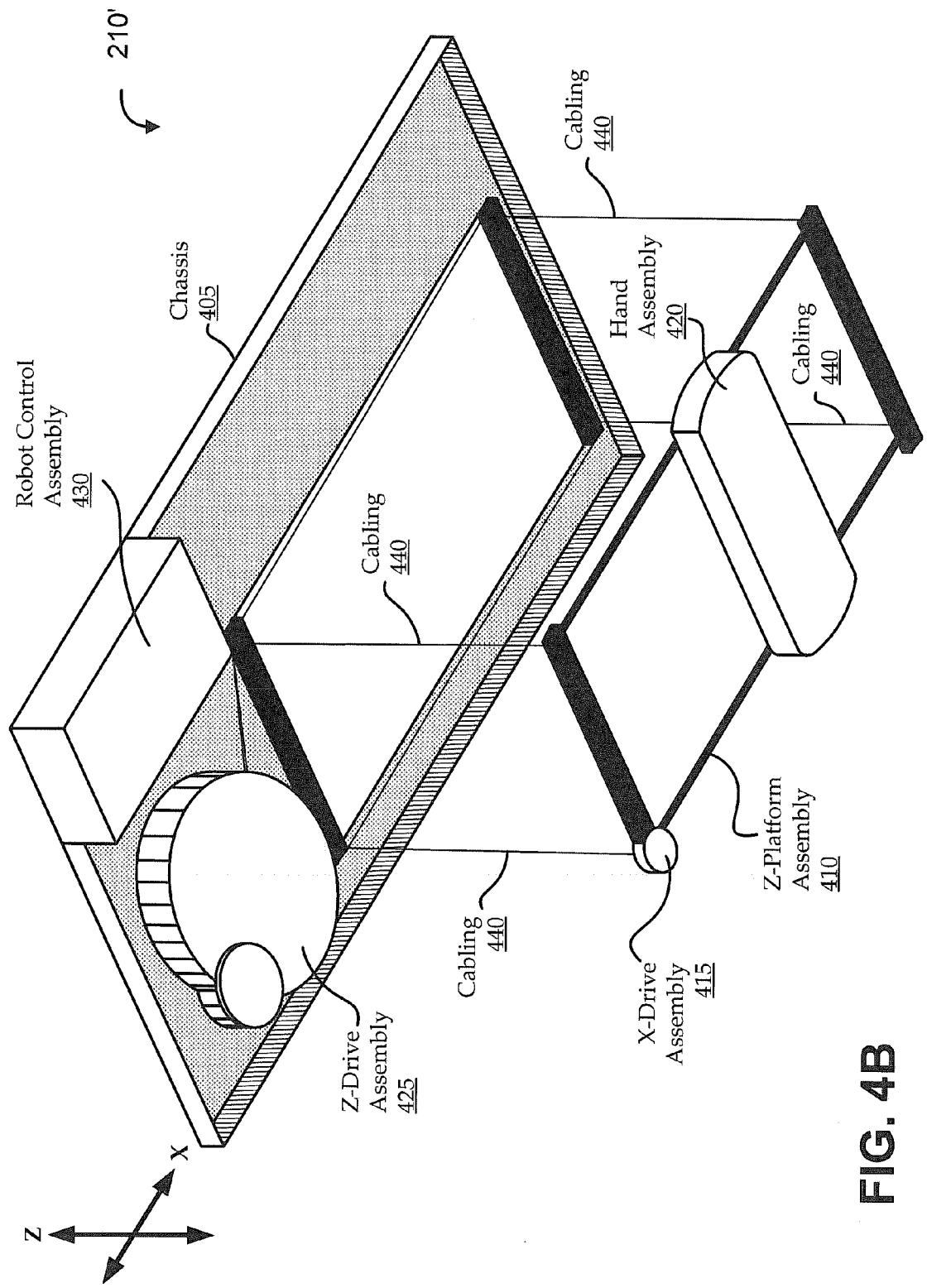
FIG. 4B shows another view looking up at the underside of an illustrative robot CRU with the Z-platform assembly partially lowered, according to various embodiments.

Much of the functionality of storage systems, like those discussed above with reference to FIGS. 1-3B, is facilitated by the robotic mechanism. As discussed above, the robotic mechanism is used to locate cartridges and ferry them between magazine slot locations and media drives. FIGS. 4A and 4B illustrate two views of an illustrative robot mechanism implemented as part of a robot CRU 210. The illustrations and descriptions of the robotic mechanism are highly simplified and represent only on possible type of implementation. Accordingly, they are intended only to add clarity and context and should not be construed as limiting the scope of the invention.

Turning to FIG. 4A, a view is shown looking down on the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410, an X-drive assembly 415, a hand assembly 420, a Z-drive assembly 425, and a robot control assembly 430.

In the implementation shown, the robotic mechanism is configured to move from its "home" position in the robot CRU 210' of the base module 110' down and/or over to any magazine 145 slot or drive in the base module 110' or an expansion module 120'. To accomplish this type of motion, the hand assembly 420 of the robotic mechanism moves in at least a "Z" direction (for the sake of FIGS. 4A and 4B, the +Z-direction is up towards the home position in the robot CRU 210, and the −Z-direction is down towards the bottom-most magazine slots of the bottom-most expansion module 120') and an "X" direction (for the sake of FIGS. 4A and 4B, the +X direction is towards the front side of the base module 110' or expansion modules 120', and the −X direction is towards the rear side of the base module 110' or expansion modules 120').

The hand assembly 420 is coupled with the Z-platform assembly 410, which can be moved in the Z-direction (i.e., raised and lowered) by the Z-drive assembly 425. The hand assembly 420 is also able to move along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. Embodiments provide other types of motion in other ways. Some embodiments of the hand assembly 420 are coupled to the Z-platform assembly 410 via a "wrist" mechanism (not shown) that provides motion in a yaw direction (i.e., around the Z-directional axis). Some embodiments of the hand assembly 420 further provide radial movement from the Z-directional axis. For example, a grabber mechanism can "reach out" in a radial direction that is determined by the yaw (rotational) orientation provided by the wrist mechanism.

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

For added clarity, FIG. 4B shows another view looking up at the underside of an illustrative robot CRU 210' with the Z-platform assembly 410 partially lowered, according to various embodiments. As illustrated, the Z-platform assembly 410 may not have a solid platform, and may instead be implemented as a carriage having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned (e.g., using a wrist mechanism) to a desired rotational orientation (e.g., to face a cartridge slot or a media drive, to provide a desired angle for use of a sensor, etc.). If desired, a gripper mechanism may then be used to reach out (i.e., radially) from that X-Z-position and rotational orientation (e.g., to grab or release a cartridge).

It will be appreciated that in embodiments, such as the one shown in FIG. 4B, the Z-platform assembly 410 moves in the Z-direction in a substantially free-floating manner. As the Z-platform assembly 410 is raised or lowered on its cables 440, tension may be maintained on the cables 440 as a result of gravity acting on the Z-platform assembly 410. However, allowing the Z-platform assembly 410 to move up or down in the Z-direction substantially without interference (e.g., without snagging at transition areas between modules) may involve either providing high tolerance transitions between modules, providing additional complex guidance mechanisms, or allowing the Z-platform assembly 410 to float at least to some extent in the Z-plane (e.g., in the X and/or Y directions). Many traditional implementations of storage libraries are designed with high tolerance transitions and/or with complex guidance mechanisms, for example, to help ensure stable robot operations with accurate and repeatable positioning. However, these approaches can increase cost and complexity of the design and can limit expandability (e.g., modularity) of the design. Embodiments described herein allow the Z-platform assembly 410 to float, thereby allowing some embodiments to be more practically deployed in contexts where cost, complexity, modularity, or the like are driving design considerations. Once in a desired location, however, biasing techniques are used to substantially lock the Z-platform assembly 410 in a stable and predictable position, thereby allowing the robotic mechanism to maintain accurate and repeatable positioning.

Figure 5:
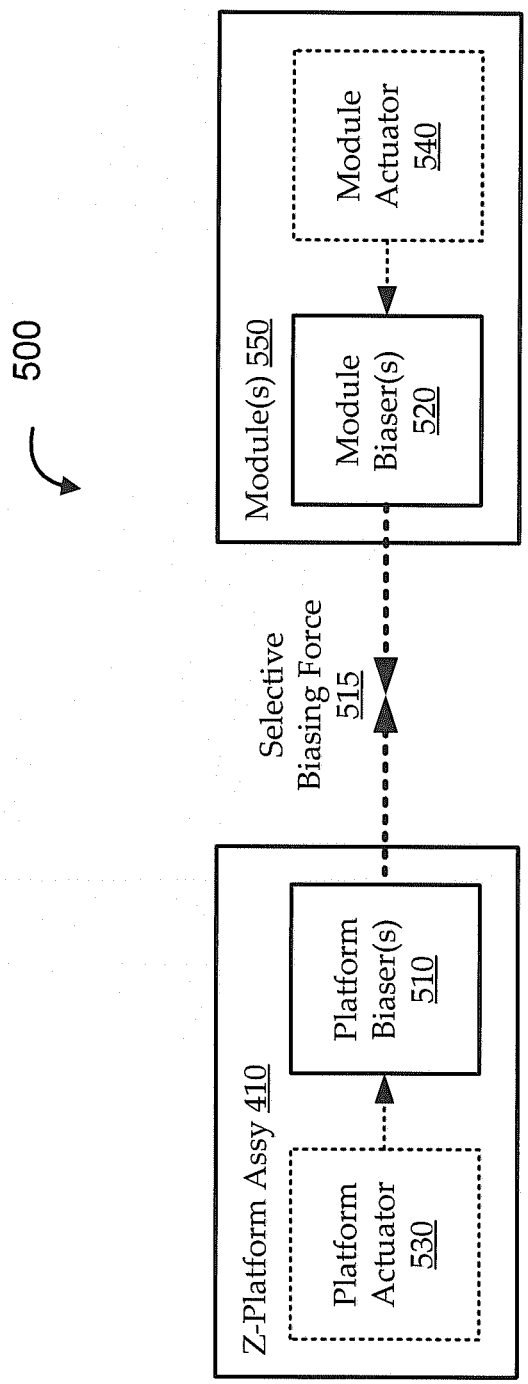
FIG. 5 shows a block diagram of an illustrative environment for selectively biasing a platform within a set of modules, according to various embodiments.

FIG. 5 shows a block diagram of an illustrative environment 500 for selectively biasing a platform within a set of modules, according to various embodiments. The selective biasing environment 500 includes the Z-platform assembly 410 and one or more modules 550. The Z-platform assembly 410 includes one or more platform biasers 510 and, optionally, a platform actuator 530. The modules 550 include one or more module biasers 520 and, optionally, one or more module actuators 540.

As described above, embodiments are designed to allow the Z-platform assembly 410 to move substantially freely at least in the Z-direction (e.g., to float with respect to the X and/or Y directions at least within a limited region). When the Z-platform assembly 410 reaches its desired position (e.g., Z-position), a selective biasing force 515 is applied to substantially block the Z-platform assembly 410 into a fixed and accurate position. The selective biasing force 515 is a selectively applied magnetic force, for example, between two magnets, between one magnet and a magnetic material, or the like.

In some embodiments, the selective biasing force 515 is applied by locating the platform biasers 510 and/or the module biasers 520 (e.g., and/or selecting or controlling the strength of the respective magnets) so that the selective biasing force 515 becomes strong enough to bias the Z-platform assembly 410 into its fixed position upon reaching its desired Z-location. For example, steel railings can be placed within tracks in the modules 550, and the steel railings can be broken, bent, treated, and/or otherwise configured to be susceptible to the selective biasing force 515 only in particular Z-locations. In some other embodiments, the magnetic force is controllable (e.g., can be toggled on and off or varied in strength) using electromagnetic techniques either at the platform biaser 510 side or at the module biaser 520 side. For example, the platform actuator 530 or the module actuator 540 can be used to electronically control the platform biaser 510 or the module biaser 520, respectively (e.g., as a function of detecting a Z-location or other triggering event).

There are many ways to implement 515, including many different embodiments of platform biasers 510, module biasers 520, and/or their respective actuators. Some embodiments are illustrated in FIGS. 6-8D, which include various implementation details. It will be appreciated, however, that those details are intended only to be illustrative and should not be construed as limiting the scope of the invention.

Figure 6:
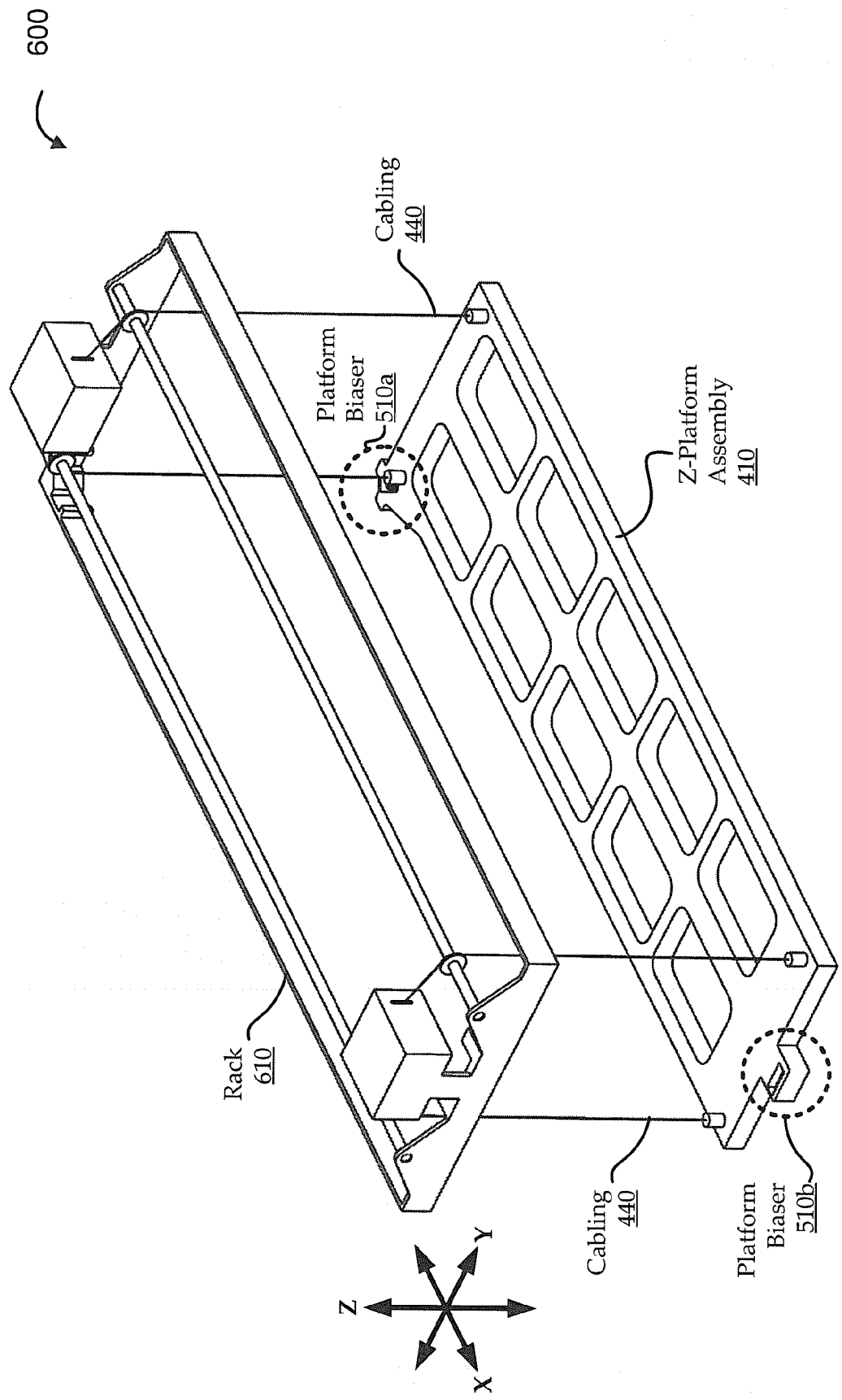
FIG. 6 shows an illustrative platform system, according to various embodiments.

Turning to FIG. 6, an illustrative platform system 600 is shown, according to various embodiments. The platform system 600 includes the Z platform assembly 410 hanging from a rack 610 (e.g., integrated into a robot CRU 210) by cabling 440. As illustrated, the cabling 440 may be attached at each of the four corners of the Z platform assembly 410 and may travel through a pulley system into one or more mechanisms for raising and lowering the Z platform assembly 410. Other techniques are possible for raising and/or lowering the Z platform assembly 410, though many of those other techniques (e.g., rack and pinion systems) tend to maintain the Z platform assembly 410 in a substantially fixed X-Y position. It is assumed for the sake of the discussion herein that the Z-movement is implemented in such a way that the X-Y positioning is at least somewhat floating.

The Z platform assembly 410 is shown having two alignment features. As will be explained more fully below, these alignment features are configured to be in communication with alignment features of one or more modules 550 (not shown) to generally guide movement of the Z platform 410 assembly while still allowing the Z platform assembly 410 to float somewhat with respect to the X and/or Y directions. The Z platform assembly 410 also includes platform biasers 510. Each platform biaser 510 is illustrated as being disposed on one of the platform alignment features, though it will be appreciated that some or all of the platform biasers 510 can be located and/or implemented separately from the platform alignment features, and there may be more or fewer platform biasers 510 than platform alignment features.

Figure 7A:
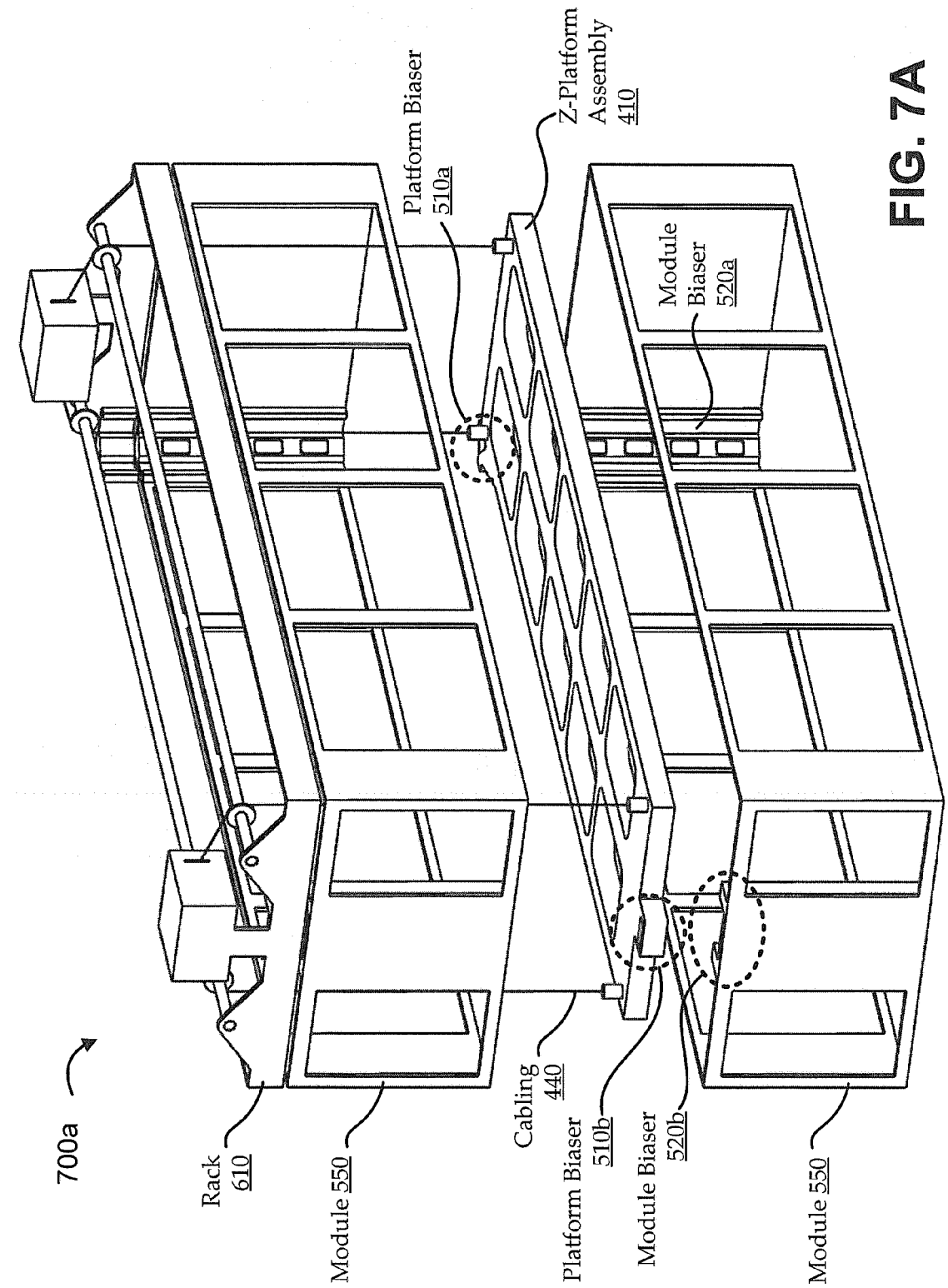
FIG. 7A shows another illustrative platform system, like the platform system of FIG. 6, in context of multiple modules, according to various embodiments.

FIG. 7A shows another illustrative platform system 700, like the platform system 600 of FIG. 6, in context of multiple modules 550, according to various embodiments. The modules 550 may, for example, be the base module 110 or expansion modules 120 of FIG. 1 as illustrated the modules may include one or more alignment features configured to be in communication with (e.g., mate with, couple with, etc.) the alignment features of the Z platform module 410. Additionally, the modules may include one or more module biasers 520, which, as discussed above, are configured to be in magnetic communication (e.g., selective magnetic medication) with the platform biasers 510.

As illustrated, a pulley system is configured to raise and lower the Z platform assembly 410 with substantially little interference from the platform and module alignment features. For example, though the alignment features of the Z platform assembly 410 are illustrated as tabs that fit within tracks integrated into the modules 550, the tabs and tracks are sized so that the tabs can substantially float within the confines of the tracks (i.e., the Z platform assembly 410, while in a substantially fixed Z location as a result of tension from the cabling 440 in one direction and gravity in the other direction, can still move to some extent in the X and/or Y directions when no biasing forces are being applied).

When the selective biasing force 515 (not shown) is applied, the platform biasers 510 are drawn magnetically to the module biasers 520 (or vice versa). This effectively causes the Z platform assembly 410 to snap into (i.e., park at) a substantially fixed X-Y location, held in place by the selective biasing force 515 applied at the one or more biasing locations. Accordingly, when the selective biasing force 515 is applied (e.g., allowed to take effect, actuated, etc.), the Z platform assembly 410 becomes substantially fixed in all of the X, Y, and Z directions. In some alternative embodiments, application of the selective biasing force 515 causes the Z platform assembly 410 to becomes substantially fixed in only two of the three directions.

In an environment, like a storage library environment, this technique can be used to park the Z platform assembly 410 on which a robotic gripper is disposed so as to provide the robotic gripper a stable platform on which to move in an accurate and predictable way. For example, the robot may be programmed to move a certain amount of space to find the desired cartridge in a slot of a magazine. If the robot moves too little or too much, even slightly, it may not be able to reliably pick and/or place cartridges, which could cause undesirable effects. Accordingly, parking the Z platform assembly 410 in a predictable and stable location, may be critical to proper robot operations in certain implementations.

Turning to FIG. 7B, a top view is shown of the illustrative platform system 700 of FIG. 7A. As can be seen from this view, the Z platform assembly 410 has two alignment features 710. A first platform alignment feature 710a is designed to ride within a track at one corner of the modules 550, labeled as module alignment feature 720a. A first platform biaser 510a is integrated into the first platform alignment feature 710a in such a way that, when the first platform alignment feature 710a is riding within the first module alignment feature 720a, the first platform biaser 510a is positioned to be magnetically coupled with the first module biaser 520a when the selective biasing force 515 is applied. A second platform alignment feature 710b is designed to ride within a track (a second module alignment feature 720b) at a side of the modules 550 substantially opposite the corner at which the first module alignment feature 720a is disposed. A second platform biaser 510b is integrated into the second platform alignment feature 710b in such a way that, when the second platform alignment feature 710b is riding within the second module alignment feature 720b, the second platform biaser 510b is positioned to be magnetically coupled with the second module biaser 520b when the selective biasing force 515 is applied.

It will be appreciated that, while the platform alignment features 710 are shown as protrusions and the module alignment features 720 are shown as rails, there are many other ways to align the Z-platform assembly 410 with the modules 550 while still allowing for float in at least some directions. In one alternative embodiment, the module alignment features 720 are protrusions and the platform alignment features 710 are rails. In another alternative embodiment, the general shape of the module 550 housing (e.g., the substantially rectangular cavity) provides sufficient alignment without additional alignment features. Other alternative embodiments include different numbers, shapes, positions, orientations, etc. of alignment features on either or both of the Z platform assembly 410 or the modules 550. Further, certain embodiments may have different alignment features on different modules 550, alignment features that can be selected (e.g., electro mechanically, or otherwise), etc. For example, various alignment features may be designed in a modular fashion to be installed for different types of uses of the Z-platform assembly 410 and/or modules 550.

Figure 8A:
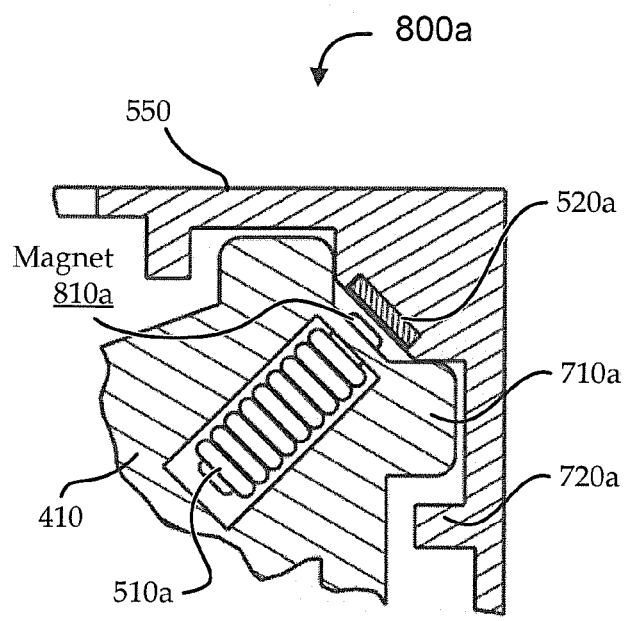
FIGS. 8A-8C show close-up views of illustrative biaser arrangements, according to various embodiments.
Figure 8B:
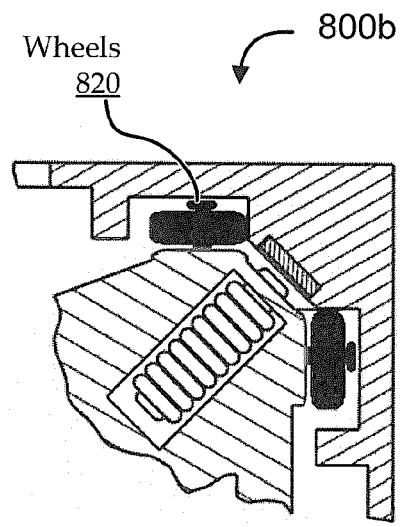
Figure 8C:
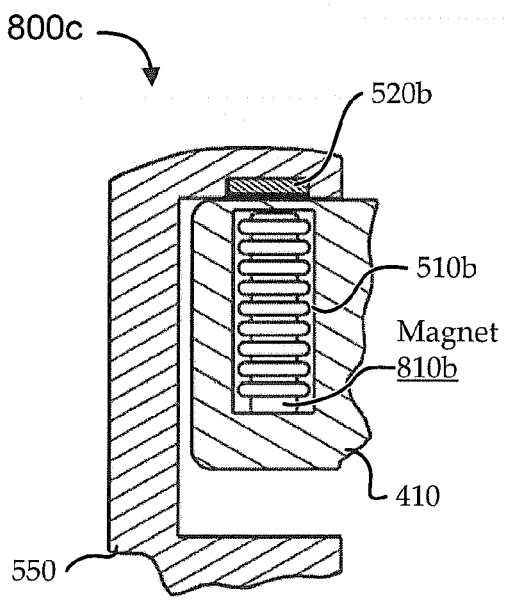

Other types of functionality can be achieved by using different types and/or configurations of biasers on the Z-platform assembly 410 and/or the modules 550. Some illustrative biaser configurations are shown in FIGS. 8A-8C. Turning first to FIG. 8A, a close-up view is shown of a biaser arrangement 800a, according to various embodiments. The biaser arrangement 800a is illustrated in context of a module 550 and the Z-platform assembly 410, for example, as illustrated in the upper right-hand corner of the illustrative platform system 700b of FIG. 7B. The Z-platform assembly 410 includes a platform alignment feature 710a configured to float within a module alignment feature 720a. A platform biaser 510a is disposed at (e.g., integrated into) the platform alignment feature 710a, and a module biaser 520a is disposed at (e.g., integrated into) the module alignment feature 720a.

Embodiments of the platform biaser 510a include a magnet assembly 810a implemented, for example, as a magnet or an electromagnet with supporting structure (e.g., one or more attachments, springs, etc.). Embodiments of the module biaser 520a include a steel rail, or other configuration of magnetic material. In certain embodiments, the platform biaser 510a and/or the module biaser 520a are configured to control the amount of magnetic force experienced by the biasers. For example, an air gap of at least a particular size can be maintained between the biasers, materials can be selected and/or treated to affect their magnetic properties, electromagnetic power can be adjusted, etc.

In some implementations, additional hardware is provided to control positioning and/or movement of the Z-platform assembly 410 with respect to the modules 550. For example, FIG. 8B shows an alternative configuration of a biaser arrangement 800b, like the biaser arrangement 800a of FIG. 8A. The alternative biaser arrangement 800b includes wheel assemblies 820. The wheel assemblies 820 may include wheels, bearings, gears, and/or any other useful hardware for providing rolling functionality. As illustrated, the wheels 820 can help the Z-platform assembly 410 to move relatively freely in the Z-direction while maintaining the air gap between the platform biaser 510a and the module biaser 520a.

FIG. 8C shows a close-up view of another biaser arrangement 800c, according to various embodiments. The biaser arrangement 800c is illustrated in context of a module 550 and the Z-platform assembly 410, for example, as illustrated on the left side of the illustrative platform system 700b of FIG. 7B. The Z-platform assembly 410 includes a platform alignment feature 710b configured to float within a module alignment feature 720b. A platform biaser 510b is disposed at (e.g., integrated into) the platform alignment feature 710b, and a module biaser 520b is disposed at (e.g., integrated into) the module alignment feature 720b. Embodiments of the platform biaser 510b include a magnet assembly 810b, which may be implemented in a similar way to, or in a different way from, the implementation of magnet assembly 810a.

Looking at any of the biaser arrangements 800, it will be appreciated that the Z-platform assembly 410 can be drawn into an accurate and predictable location with respect to the modules 550 by applying a magnetic force between the platform biasers 510 and the module biasers 520. In this way, the Z-platform assembly 410 can effectively be parked, for example, to facilitate accurate and predictable robotic mechanism operations. Many different techniques are described above for providing an environment in which the magnetic force (i.e., the selective biasing force 515) can be applied to park the Z-platform assembly 410. There are also many different possible techniques for selecting whether, when, and to what extent to apply the selective biasing force 515, according to various embodiments.

According to one set of embodiments, the magnetic force (e.g., produced by the magnet assembly 810 of the platform biaser 510) is always present, and one or more techniques are used to mitigate the parking effects of the force at least during Z-directional movement of the Z-platform assembly 410. In one such embodiment, as illustrated in FIGS. 8A and 8B, and air gap is provided to reduce the effects of the magnetic force. The magnetic force is weak enough so that a force applied to raise the Z-platform assembly 410 (e.g., using the cabling 440 and pulleys) and/or a force applied to lower the Z-platform assembly 410 (e.g., using the weight of the Z-platform assembly 410 under the effects of gravity) can easily move the Z-platform assembly 410 in the Z-direction without being appreciably hindered by the magnetic force; while at the same time, the magnetic forces are strong enough to maintain the Z-platform assembly 410 in a parked state during lateral movements in the plane of the Z-platform assembly 410 (e.g. robotic mechanism movements in the X and/or Y directions). Other such embodiments use other techniques to produce a similar effect. For example, magnetic material of the module biaser 520 may only be present in certain locations where parking is desired (e.g., by providing breaks in a railing, by bending a railing to change the size of the air gap in certain locations, by using treating or coatings, by using discrete-sized magnetic elements, etc.).

According to another set of embodiments, the magnetic force is only actuated when parking is desired. Actuating the magnetic force may involve turning the force on or off, or changing the magnitude of the force within some range. Various techniques are possible for selecting whether, when, and to what extent the magnetic force is applied. In one such embodiment, the platform biasers 510 and/or the module biasers 520 include one or more electromagnets which can be turned on or off, or otherwise adjusted. For example, control signals are used to raise or lower the Z-platform assembly 410 to desired Z-position, at which point further control signals are used to turn on the selective biasing force 515 by actuating one or more electromagnets.

In another such embodiment, one or more mechanical (e.g., electromechanical elements, micro-electromechanical system elements, etc.) elements or subassemblies can be used to turn on or off, or otherwise adjust the magnitude of the applied magnetic force. For example, a door, flap, shutter, or the like can be mechanically and selectively introduced between the platform biaser 510 in the module biaser 520 to interfere with the magnetic coupling between the biasers. Alternatively, one or more magnetic elements can be mechanically moved with respect to other magnetic elements. For example, the magnet 810*a* illustrated as part of the platform biaser 510*a* in FIG. 8A can be mechanically pulled away from the steel rail illustrated as part of the module biaser 520*a* in FIG. 8A. In other such embodiments, electromagnetic techniques can be combined with electromechanical techniques to provide similar or different functionality.

It will be appreciated that, in embodiments involving electromechanical and/or electromagnetic techniques one or more control signals may be used to select whether, when, and/or to what extent to apply the biasing force. These control signals can be generated in different ways and in different locations according to different embodiments. In some implementations, some or all of the control signals are generated by a central processor, a PIC controller, or the like implemented as part of one or more of the modules 550. In other implementations, control signals are generated as a function of sensor data. For example, one or more sensors may detect when the Z-platform assembly 410 has reached the desired Z-location, and may generate control signals for activating or deactivating the biasing force, accordingly. In still other implementations, other feedback control mechanisms, self-controlling subassemblies, or the like are used. For example, the wheels 820 of FIG. 8B can be used to affect application of the biasing force. In one implementation, the rolling of the wheels is linked to a mechanism that causes the magnet 810*a* to move away from the steel railing of module biaser 520*a* of FIG. 8A (reducing the magnetic coupling between the biasers). In another implementation, the rolling of the wheels 820 causes a counter-electromagnetic force to be applied to counteract the magnetic coupling (e.g., by effective pushing the Z platform assembly 410 out of its biased position against the module 550).

Figure 9:
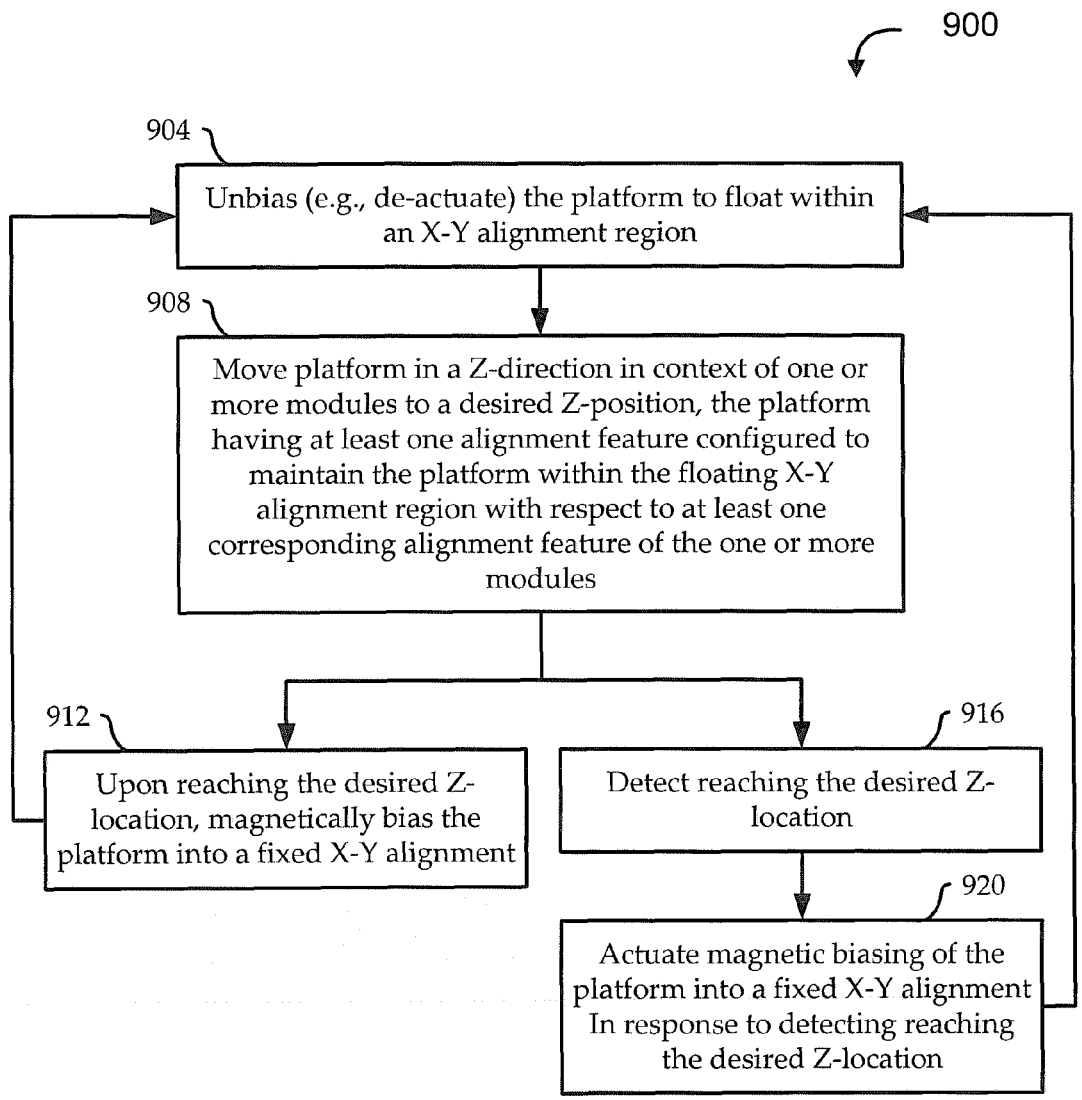
FIG. 9 shows a flow diagram of an illustrative method for selectively applying a biasing force to park a platform in a desired Z-location when desired, according to various embodiments.

While some embodiments are described herein as selectively applying a biasing force, it will be appreciated that similar embodiments can be implemented as selectively removing (or lessening) the biasing force. In one illustrative embodiment, the magnet 810*a* is a permanent magnet and the module biaser 520*a* is a steel railing including occasional (e.g., periodic) non-magnetic portions (e.g., breaks in the steel, bends out-of-plane to increase the air gap, non-magnetic coatings, etc.). When the Z-platform assembly 410 moves along the magnetic portions of the railing, it stays substantially biased (e.g., magnetically attracted) to the steel railing; the Z-platform assembly 410 becomes "de-biased" (e.g., no longer magnetically parked against the railing) only as it passes over the non-magnetic portions. For example, non-magnetic sections of the railing (e.g., breaks in the steel) may be present at each intersection between modules 550 to help ensure that the robot seamlessly passes between the module 550 transitions. Similar functionality can be achieved by normally keeping an electromagnet on and selectively turning it off FIG. 9 shows a flow diagram of an illustrative method 900 for selectively applying a biasing force to park a platform in a desired Z-location when desired, according to various embodiments. Embodiments of the method 900 begin at stage 904 by un-biasing the platform to float within an X-Y alignment region. As described above, un-biasing the platform may involve simply overcoming magnetic biasing forces by using Z-directional movement. Alternatively, un-biasing the platform may involve de-actuating one or more components that are applying the biasing force.

At stage 908, the platform can be moved in the Z-direction in context of one or more modules to desired Z position. As described above, the platform may have one or more alignment features configured to interface with one or more alignment features of the modules, thereby maintaining the platform within a floating X-Y alignment region with respect to the one or more modules. The alignment region can have different tolerances depending on the implementation. For example, the alignment region may be designed to be just large enough to allow for substantial interference-free, Z-directional movement. Alternatively, some implementations may be able to tolerate a relatively large alignment region that allows for substantial amount of float (e.g., in the X and/or Y directions).

As discussed above, the selective biasing force can be applied in many different ways. In some embodiments, the selective biasing force is applied in an effectively passive manner. At stage 912, upon reaching the desired Z-location the platform becomes magnetically biased into a fixed X-Y alignment (e.g., a substantially fixed X-Y position, orientation, etc.). For example, tuning the strength of the magnetic coupling force, strategically placing magnetic elements, or other techniques can be used so that the biasing force automatically becomes "applied" when the platform reaches its desired Z-location (e.g., when the platform stops moving in the Z-direction).

In other embodiments, the selective biasing force can be applied more actively. For example control signals, sensor feedback, and/or other techniques can be used to actively actuate components that applied the selective biasing force. At stage 916, embodiments detect that the platform has reached the desired Z-location. As discussed above, this detection can involve feedback from sensors, completion of a prescribed movement, etc. At stage 920, in response to detecting that the platform has reached the desired Z-location, the selective biasing force is actuated.

Whether by techniques such as those of stage 912 or such as those of stage 920, the platform is effectively parked in an X-Y position by those respective stages. Accordingly, these techniques can be used to create a stable platform environment from which to perform various types of functions, for example, various robotic mechanism operations. In some embodiments, the method 900 continues from either of stage 912 or 920 by returning to stage 904 when the next Z-directional movement of the platform is desired.

It will be appreciated that, as used herein, a "platform" may be implemented in any manner capable of conveying and providing structure for other components or mechanisms. For example, some implementations of the Z-platform assembly are formed by a set of rails without a planar structure in place. Further, the "modules" described herein can be implemented as any type of structure or frame that effectively defines an area within which the platform can move. Still further, though particular directions (e.g., "Z") are discussed herein, those directions are intended only to be illustrative and should not be construed as limiting the scope of embodiments. For example, it is not intended that the X, Y, and Z directions are necessarily orthogonal to each other, that positive values necessarily connote a particular direction along an axis, etc., except where otherwise explicitly stated.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for selectively biasing a platform, the system comprising:
   a module having a frame that defines a cavity, the module comprising a module biaser, and the housing defining a module alignment feature;
   a platform comprising:
      a platform alignment feature configured to engage with the module alignment feature in such a way that forms an alignment region within which the platform floats substantially orthogonally to a Z direction while the platform is traveling in the Z direction; and
      a platform biaser configured to magnetically engage with the module biaser in such a way that parks the platform in a substantially fixed position within the alignment region when the platform is not traveling in the Z direction,
   wherein at least one of the platform biaser or the module biaser comprises a magnet configured to exert a magnetic force on the other of the platform biaser or the module biaser.

2. The system of claim 1, wherein:
the magnetic force is strong enough to magnetically engage with the other of the platform biaser or the module biaser in such a way that parks the platform in the substantially fixed position within the alignment region when the platform is not traveling in the Z direction, and
the magnetic force is weak enough to disengage from the other of the platform biaser or the module biaser when a Z-directional force is applied to move the platform in the Z direction.

3. The system of claim 2, wherein applying the Z-directional force comprises allowing gravitational force to pull the platform in the Z direction.

4. The system of claim 1, wherein the magnet is configured to exert the magnetic force over a defined air gap created between the platform biaser and the module biaser when the platform is parked in the substantially fixed position within the alignment region.

5. The system of claim 1, wherein the other of the platform biaser or the module biaser comprises a magnetic material.

6. The system of claim 1, wherein the magnet is a permanent magnet.

7. The system of claim 6, wherein:
the alignment region comprises one or more biasing sub-regions and one or more non-biasing sub-regions; and
the platform floats substantially orthogonally to the Z direction while the platform is traveling in the Z direction when the platform is in the non-biasing sub-region of the alignment region.

8. The system of claim 1, wherein the magnet is an electromagnet.

9. The system of claim 8, further comprising:
an actuator configured to selectively actuate the electromagnet to exert the magnetic force to magnetically engage the platform biaser with the module biaser in such a way that parks the platform in a substantially fixed position within the alignment.

10. The system of claim 9, wherein the actuator is further configured to receive an actuation signal when the platform is at a desired Z location, and to selectively actuate the electromagnet to exert the magnetic force in response to receiving the actuation signal.

11. The system of claim 1, wherein one of the platform alignment feature or the module alignment feature comprises a protrusion, and the other of the platform alignment feature or the module alignment feature is configured to at least partially surround the protrusion in such a way as to define the alignment region.

12. The system of claim 1, wherein the module alignment feature comprises the module biaser and the platform alignment feature comprises the platform biaser.

13. The system of claim 1, wherein the platform is configured to support a robotic mechanism for picking and placing media cartridges in magazines of a storage library system disposed within the module.

14. A method for selectively biasing a platform, the method comprising:
moving a platform in a Z direction to a desired Z location with respect to a module, the module having a frame that defines a cavity, the platform comprising a platform alignment feature configured to engage with a module alignment feature of the module in such a way that forms an alignment region within which the platform floats substantially orthogonally to the Z direction while traveling in the Z direction; and
upon reaching the desired Z location, parking the platform in a substantially fixed position within the alignment region by using a magnet to magnetically engaging a platform biaser of the platform with a module biaser of the module,
wherein at least one of the platform biaser or the module biaser comprises the magnet, and the magnet is configured to exert a magnetic force on the other of the platform biaser or the module biaser.

15. The method of claim 14, wherein:
the magnetic force is strong enough to automatically park the platform in the substantially fixed position within the alignment region when the platform is not traveling in the Z direction, and
the magnetic force is weak enough to disengage from the other of the platform biaser or the module biaser when a Z-directional force is applied to move the platform in the Z direction.

16. The method of claim 14, wherein:
the magnet is an electromagnet in communication with an actuator configured to adjust the magnetic force generated by the electromagnet; and
parking the platform in a substantially fixed position within the alignment region comprises using the actuator to adjust the magnet force generated by the electromagnet to magnetically engage the platform biaser with the module biaser.

17. The method of claim 16, further comprising:
detecting that the platform has reached the desired Z location; and
using the actuator to magnetically engage the platform biaser with the module biaser in response to the detecting.

18. The method of claim 17, further comprising:
disengaging the platform biaser from the module biaser by applying a directional force in the Z direction to the platform to break magnetic engagement between the platform biaser and the module biaser,
wherein the magnet is a permanent magnet, and
wherein moving the platform in the Z direction comprises continuing to apply the directional force in the Z direction.

19. The method of claim 18, wherein:
continuing to apply the directional force in the Z direction comprises releasing counter-gravitational tension on the platform to allow gravitational force to pull the platform in the Z direction.

20. The method of claim 17, further comprising:
disengaging the platform biaser from the module biaser by using an actuator to adjust the magnet force generated by an electromagnet to release magnetic engagement between the platform biaser and the module biaser,
wherein the magnet is the electromagnet in communication with the actuator configured to adjust the magnetic force generated by the electromagnet.

* * * * *

UNITED STATES PATENT AND TRADEMARK OFFICE
CERTIFICATE OF CORRECTION

PATENT NO. : 8,890,458 B2  
APPLICATION NO. : 13/350437  
DATED : November 18, 2014  
INVENTOR(S) : Ostwald et al.

Page 1 of 1

It is certified that error appears in the above-identified patent and that said Letters Patent is hereby corrected as shown below:

In the Drawings

On sheet 6 of 11, in figure 5, under Reference Numeral 410, line 1, delete "Assy" and insert -- Assembly --, therefor.

On sheet 9 of 11, in figure 7B, under Reference Numeral 710a, line 2, delete "Alignmt" and insert -- Alignment --, therefor.

On sheet 9 of 11, in figure 7B, under Reference Numeral 720a, line 2, delete "Alignmt" and insert -- Alignment --, therefor.

On sheet 9 of 11, in figure 7B, under Reference Numeral 720b, line 2, delete "Alignmt" and insert -- Alignment --, therefor.

On sheet 9 of 11, in figure 7B, under Reference Numeral 710b, line 2, delete "Alignmt" and insert -- Alignment --, therefor.

In the Specification

In column 1, line 55, delete "and or" and insert -- and/or --, therefor.

In column 5, line 23, delete "and or" and insert -- and/or --, therefor.

In column 6, line 18, delete "and or" and insert -- and/or --, therefor.

In column 14, line 25, delete "off" and insert -- off. --, therefor.

Signed and Sealed this  
Twenty-third Day of June, 2015

Michelle K. Lee  
*Director of the United States Patent and Trademark Office*